US012668158B2

(12) United States Patent　　　　(10) Patent No.:　US 12,668,158 B2
Shiota　　　　　　　　　　　　　　　　(45) Date of Patent:　　Jun. 30, 2026

(54) POWER SEAT FOR AUTOMOBILE

(71) Applicant: TOYOTA JIDOSHA KABUSHIKI KAISHA, Toyota (JP)

(72) Inventor: Atsushi Shiota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 18/413,029

(22) Filed: Jan. 16, 2024

(65) Prior Publication Data

US 2024/0286533 A1　　Aug. 29, 2024

(30) Foreign Application Priority Data

Feb. 24, 2023　(JP) ................................. 2023-027797

(51) Int. Cl.
B60N 2/20　　　　(2006.01)
B60N 2/30　　　　(2006.01)
B60R 25/01　　　　(2013.01)

(52) U.S. Cl.
CPC .............. B60N 2/20 (2013.01); B60N 2/3011 (2013.01); *B60R 25/014* (2013.01)

(58) Field of Classification Search
CPC ........ B60N 2/20; B60N 2/3011; B60R 25/014
See application file for complete search history.

(56) References Cited

U.S. PATENT DOCUMENTS 4,997,053 A　*　3/1991　Drori ..................... B62D 1/181
　　　　　　　　　　　　　　　　　　　　180/289
2022/0348163 A1　11/2022　Shiota et al.

FOREIGN PATENT DOCUMENTS

JP　　　S63-061664 A　　3/1988
JP　　　H03-088872 U　　9/1991
JP　　　H06-206483 A　　7/1994
JP　　　2022-171021 A　　11/2022

* cited by examiner

*Primary Examiner* — Syed A Islam
(74) *Attorney, Agent, or Firm* — SOLARIS Intellectual Property Group, PLLC

(57)　　　　　　　　ABSTRACT

An automobile power seat includes: a seat cushion configured to move to an anti-theft seat position, at which it is impossible to board the automobile, at a time of cockpit locking, and, at a time of cockpit unlocking, to move to a boarding seat position at which it is possible to board the automobile, and then to a driving seat position at which it is possible to drive the automobile; and a controller having a storage unit at which the boarding seat position and the driving seat position can be registered differently for each user, the controller being configured to control movement of the seat cushion, wherein a movement distance of the seat cushion from the anti-theft seat position to the boarding seat position is shorter than a movement distance of the seat cushion from the anti-theft seat position to the driving seat position.

4 Claims, 6 Drawing Sheets

Pb2

Pr

Ps2

Pr    Ps1

POWER SEAT FOR AUTOMOBILE

CROSS-REFERENCE TO RELATED APPLICATION

This application is based on and claims priority under 35 USC 119 from Japanese Patent Application No. 2023-027797, filed on Feb. 24, 2023, the disclosure of which is incorporated by reference herein.

BACKGROUND

Technical Field

The present invention relates to a power seat for an automobile.

Background Art

In automobile power seats, an automobile anti-theft device (a so-called cockpit locking device using a seat) in which an actuator is driven after a predetermined time has elapsed after an engine key has been pulled out, which slides a seat cushion to a furthest forward position, and tilts a seatback forward, is conventionally known (see, for example, Japanese Patent Application Laid-open (JP-A) No. H03-08872).

As described above, in an automobile power seat, as a result of a cockpit locking operation by a user (driver) who has disembarked from the vehicle, prevention of theft is achieved by automatically moving the seat cushion from a driving seat position to a cockpit locked seat position (anti-theft seat position), which is a furthest forward position. In a power seat of this kind, as a result of a cockpit unlocking operation by a user boarding the vehicle, the seat cushion automatically moves from the cockpit locked seat position (anti-theft seat position) to the driving seat position of the user who previously disembarked.

As a result, even in cases in which another user having a different physical stature from the user who previously disembarked (for example, a driver of smaller stature than the driver who previously disembarked) boards the vehicle at this time, as a result of a cockpit unlocking operation by the user boarding the vehicle at this time, the seat cushion moves from the cockpit locked seat position (anti-theft seat position) to the driving seat position of the user who previously disembarked from the vehicle.

Accordingly, the user boarding the vehicle at this time needs to perform another operation to move the seat cushion to a seat position for his/her own driving.

In this manner, in cases in which a user having a different physical stature from at the time of cockpit locking (a driver with a different body size from the driver who previously disembarked) performs cockpit unlocking and boards the automobile, the movement time of the seat cushion from the cockpit locked seat position (anti-theft seat position) to the driving seat position of the user boarding the vehicle at this time is lengthened.

Namely, the waiting time until the seat cushion moves to a boarding seat position at which the user boarding the vehicle at this time is able to board the vehicle (in this case, the driving seat position of the user who previously disembarked, and the adjustment time until the seat cushion moves to a driving seat position at which driving becomes possible after the user boarding the vehicle this time has boarded, are lengthened. Accordingly, there are difficulties when a user wants to board an automobile quickly in rainy weather, for example, or further, when a user wishes to start an automobile in a hurry.

SUMMARY

Here, in the present disclosure, an object of the present invention is to obtain an automobile power seat that is capable of reducing at least a waiting time to a boarding seat position at which a user is able to board the vehicle, even in cases in which a user with a different body size from at the time of cockpit locking performs cockpit unlocking and boards the vehicle.

Means for Solving the Problem

In order to achieve the above object, an automobile power seat of a first aspect includes: a seat cushion configured to move to an anti-theft seat position, at which it is impossible to board the automobile, at a time of cockpit locking by a user who has disembarked, and, at a time of cockpit unlocking by a user who is boarding, to move to a boarding seat position at which the user who is boarding is able to board the automobile, and then to a driving seat position at which the user who is boarding is able to drive the automobile; a seatback configured to rotate to a furthest forward tilt position at the time of cockpit locking, and to rotate to a predetermined rearward tilt position at the time of cockpit unlocking; and a controller having a storage unit at which the boarding seat position and the driving seat position can be registered differently for each user, the controller being configured to control movement of the seat cushion and rotation of the seatback, in which a movement distance of the seat cushion from the anti-theft seat position to the boarding seat position is shorter than a movement distance of the seat cushion from the anti-theft seat position to the driving seat position.

According to the automobile power seat of the first aspect, at a time of cockpit locking by a user who has disembarked from the vehicle, the seat cushion of the automobile power seat moves to an anti-theft seat position, at which it is impossible to board the automobile, and the seatback of the automobile power seat tilts forward to the furthest forward tilt position. Since, as a result, a person cannot get into the automobile (in particular, the driver's seat), theft of the automobile is prevented.

Further, at a time of cockpit unlocking by a user who is boarding the vehicle, the seat cushion of the automobile power seat, after moving to a boarding seat position at which the user is able to board the automobile, moves to a driving seat position at which it is possible for the user to drive the automobile. Further, the seatback of the automobile power seat is rotated to a predetermined rearward tilt position when the cockpit is unlocked by the user boarding the vehicle.

Here, different driving seat positions and boarding seat positions for each user can be registered in the storage unit of the controller. Therefore, even in cases in which a user having a different body size from the time of cockpit locking unlocks the cockpit and boards the vehicle, the seat cushion simply moves from the anti-theft seat position to the boarding seat position previously registered by the user.

Further, the movement distance of the seat cushion from the anti-theft seat position to the boarding seat position is shorter than the movement distance of the seat cushion from the anti-theft seat position to the driving seat position. Accordingly, in the automobile power seat, at least the waiting time to the boarding seat position is reduced.

An automobile power seat of a second aspect is the automobile power seat of the first aspect, in which the controller, upon detecting that a seat belt is worn, moves the seat cushion from the boarding seat position to the driving seat position.

According to the automobile power seat of the second aspect, when the seatbelt is worn, the seat cushion moves from the boarding seat position to the driving seat position. Accordingly, compared to cases in which the user separately operates the seat cushion to move from the boarding seat position to the driving seat position, complicated operation is not required, and the time from boarding to driving becoming possible is efficiently reduced.

An automobile power seat of a third aspect is the automobile power seat of the first or the second aspect, in which the controller automatically sets the boarding seat position in accordance with the registered driving seat position.

According to the automobile power seat of the third aspect, the boarding seat position is automatically set in accordance with the registered driving seat position. Accordingly, an appropriate boarding seat position is easily and accurately set in accordance with the body size of the user, and the waiting time to the boarding seat position is efficiently reduced.

An automobile power seat of a fourth aspect is the automobile power seat of any one of the first to the third aspects, in which the seatback is configured to rotate to a rearward tilt position at which driving of the automobile becomes possible for the user who is boarding at the time of cockpit unlocking, and the rearward tilt position can be registered differently for each user.

According to the automobile power seat of the fourth aspect, at a time of cockpit unlocking by the user who is boarding, the seatback of the power seat rotates to a rearward tilt position at which the boarding user is able to drive the automobile. Further, different rearward tilt positions for each user can be registered at the storage unit. Accordingly, even in cases in which a user with a different body size from at the time of cockpit locking unlocks the cockpit and boards the vehicle, the time from boarding to driving becoming possible is efficiently reduced.

As described above, in the automobile power seat according to the present disclosure, at least the waiting time to the boarding seat position at which the user is able to board can be reduced even in cases in which a user with a different body size from at the time of cockpit locking performs cockpit unlocking and boards the vehicle.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments of the present disclosure, based on the drawings. Note that for convenience of explanation, in each of the drawings, as appropriate, the arrow UP indicates a seat upper direction, and the arrow FR indicates a seat forward direction. Thus, in the following explanation, in cases in which reference to up and down, and front and rear, directions is made, unless otherwise specified, these indicate up and down, and front and rear, in an automobile power seat 10, which is described below. Further, the left and right direction is the same as the seat width direction.

Figure 1:
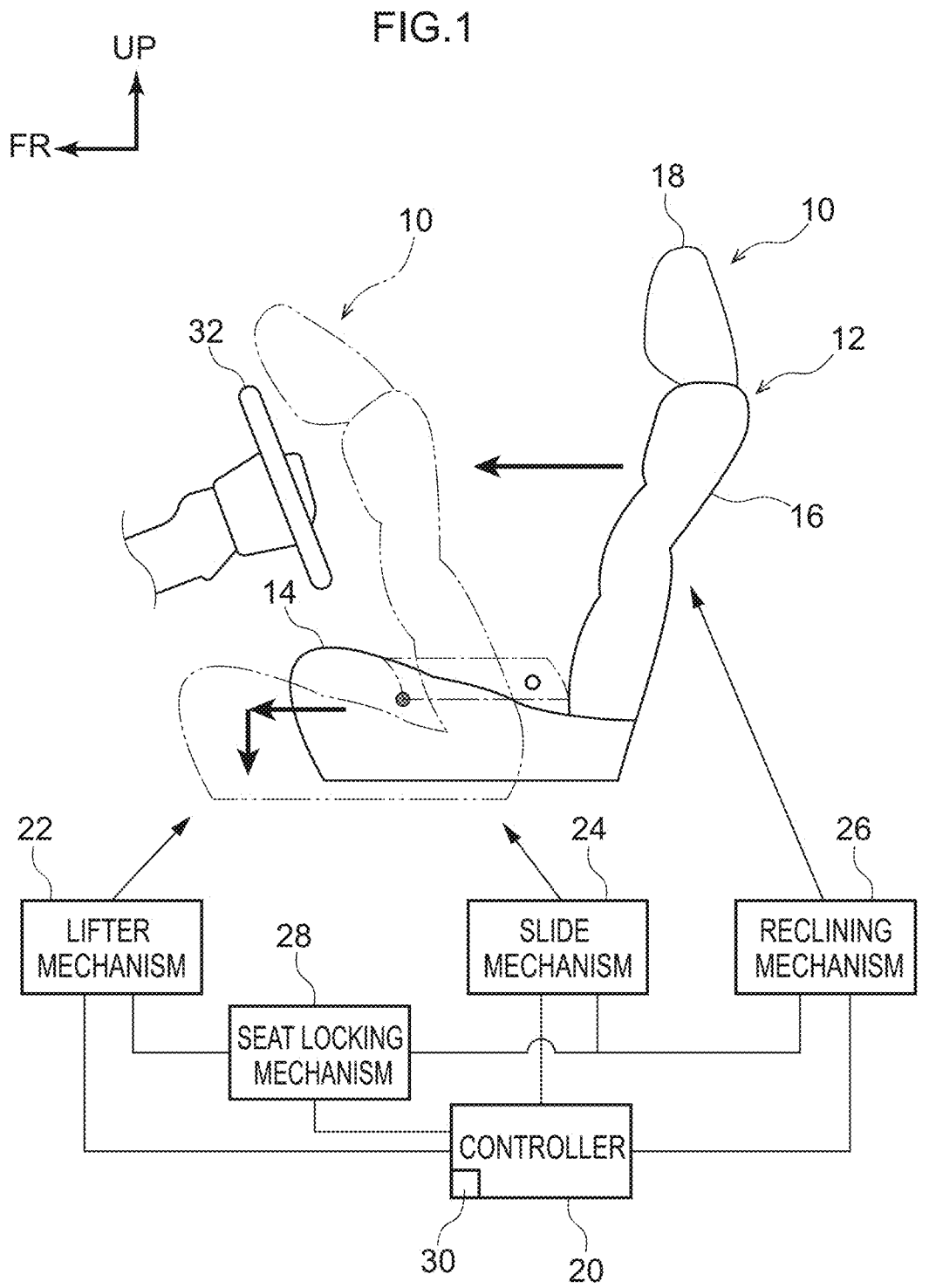
FIG. 1 is a schematic side view schematically illustrating movement of an automobile power seat according to the present exemplary embodiment to an anti-theft seat position, together with a controller and respective mechanisms.

As illustrated in FIG. 1, an automobile power seat (hereafter, also simply referred to as a "power seat") 10 according to the present exemplary embodiment is a seat for at least a driver's seat of an automobile (not illustrated), and includes a seat body 12 and a controller 20. The power seat 10 has a so-called cockpit locking function that prevents theft of the automobile (improves security) whereby, after a user (the driver) has disembarked from the vehicle, the controller 20 effects control such that the position and posture of the seat body 12 are locked in a position and posture such that a person (a thief) cannot get into the vehicle.

As illustrated in FIG. 1, the seat body 12 of the power seat 10 includes a seat cushion 14 on which a user (driver) is seated (supporting the user's buttocks and thighs), a seatback 16 that is rotatably provided at a lower end portion at a rear side of the seat cushion 14 with a seat width direction as an axial direction, and that supports a back portion of the user, and a headrest 18 that is provided at an upper end portion of the seatback 16 such that its height is adjustable and that supports the head of the user.

A left and right pair of lower rails (not illustrated) extending in the front-rear direction are provided on a floor (not illustrated) of a vehicle cabin of an automobile, and the lower rails respectively support a left and right pair of upper rails (not illustrated) provided at respective seat width direction side lower portions of the seat cushion 14 so as to be slidable along the front-rear direction. Further, the upper rails (seat cushion 14) are configured to be slidable along the lower rails by means of a known slide mechanism 24.

The seat cushion 14 supported by the respective upper rails is configured to be movable up and down with respect to the respective upper rails by a known lifter mechanism 22. This front-rear movement and up-down movement of the seat cushion 14, and tilting (rotation) of the seatback 16 by a known reclining mechanism 26, and the like, are controlled (automatically executed) by the controller 20.

The controller 20 is an electronic control unit (ECU) that controls at least front-rear movement and up-down movement of the seat cushion 14, and tilting (rotation) of the seatback 16, and is provided at the seat body 12. Further, the controller 20 has a built-in storage unit (memory) 30 that is capable of registering at least the position of the seat cushion 14 (the driving seat position) and the posture of the seatback 16 (the rearward tilt position) at which the automobile can be driven by the user, and a position of the seat cushion 14 (the boarding seat position) at which the user is capable of boarding the automobile.

Thus, in cases in which the user has performed an operation using a smart key, which is described below, such that the position (the driving seat position and the boarding seat position) and posture (the rearward tilt position) of the seat body 12 are adjusted, and the position and posture are registered, the position and posture are registered in the storage unit 30 as a set position and posture of the user. Note that plural set positions and postures can be set, as described later, and different set positions and postures for respective users can be registered in the storage unit 30.

In cockpit locking using the seat body 12 of the power seat 10, the configuration is such that actuation (movement and rotation) takes place when a side door (not illustrated) at the driver seat side has been locked by operation of a smart key (not illustrated), which is a portable small-size communication device, possessed by a user. Note that in the following, a case in which the side door at the driver seat side has been locked by operation of the smart key is referred to as "a time of cockpit locking".

At a time of cockpit locking, the controller 20 that has received a locking signal effects control such that the slide mechanism 24 is driven and the seat cushion 14 moves to the furthest forward position, the lifter mechanism 22 is driven and the seat cushion 14 is lowered (moved) to a furthest downward position, and the reclining mechanism 26 is driven and the seatback 16 is tilted forward (rotates) to a furthest forward tilt position.

Further, a known seat locking mechanism 28 is actuated by control by the controller 20, and is locked so as to maintain the position and posture. Namely, the seat body 12 moves from the position illustrated by a solid line in FIG. 1 to the position illustrated by a virtual line, and is locked in this position and posture. Note that in the following, the position of the seat cushion 14 at this time is referred to as an "anti-theft seat position".

A steering wheel 32 is installed at the front side of the power seat 10 (seat body 12) at the driver's seat side. Thus, during cockpit locking, the upper end portion of the seatback 16 and the headrest 18 are disposed close to the steering wheel 32, and a gap between the steering wheel 32, and the upper end portion of the seatback 16 and the headrest 18, is extremely small (narrow). As a result, there is no room for a person (thief) to get onto the power seat 10 (the seat body 12), and theft of the automobile is prevented.

Note that the steering wheel 32 may be configured so as to be capable of moving in the front-rear direction, and may be configured such that during cockpit locking, the steering wheel 32 is automatically moved rearward, and the gap between the steering wheel 32, and the upper end portion of the seatback 16 and the headrest 18, is further reduced (narrowed). Further, the seat locking mechanism 28 may be configured with an electrical structure whereby electricity supply is forcibly cut off, and may be configured including, for example, a mechanical lock mechanism that is actuated by electricity supply.

Further, a smart key is prepared for each user for whom there is a possibility of driving the automobile. In other words, each user for whom there is a possibility of driving the automobile possesses his or her own smart key. Thus, each user can register the above-described set position and posture in the storage unit 30 by operating his/her own smart key.

Explanation follows regarding movement of the seat body 12 when the side door at the driver seat side has been unlocked by operation of the smart key (at a time of cockpit unlocking). Note that in the following, a case in which the side door at the driver seat side has been unlocked by operation of the smart key is referred to as "a time of cockpit unlocking".

In FIGS. 1 to 6, the circle "○" (including a broken line version) indicates a reference seated point (the position of the user's buttocks in side view) of the seat cushion 14, and in FIGS. 1 to 6, the solid circle "●" indicates a case in which the reference seated point is positioned at the anti-theft seat position Pr. The outline with a substantially parallelogram shape in FIGS. 1 to 6 indicates an adjustable range of the reference seated point.

At a time of cockpit unlocking by a user who is boarding the vehicle, the locking by the seat locking mechanism 28 is released by control by the controller 20, which has received an unlocking signal, and the seat cushion 14 automatically moves (slides and rises toward the rear side) to the set positions (the boarding seat position and the driving seat position) registered in advance in the storage unit 30 by the user, and the seatback 16 is automatically tilted backward (rotated) to a posture (rearward tilt position) registered in advance in the storage unit 30 by the user.

Figure 2A:
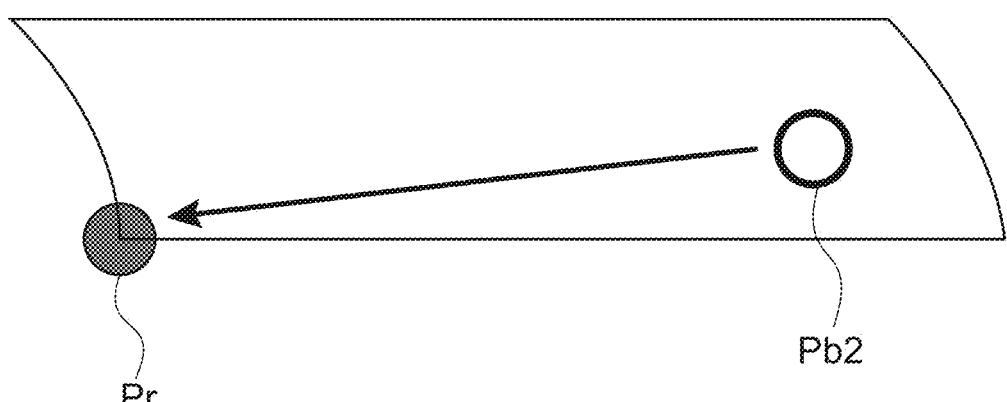
FIG. 2A is an explanatory view schematically illustrating movement of a seat cushion at a time of cockpit locking by a user of large physical stature who disembarks from a vehicle, according to the present exemplary embodiment.
Figure 2B:
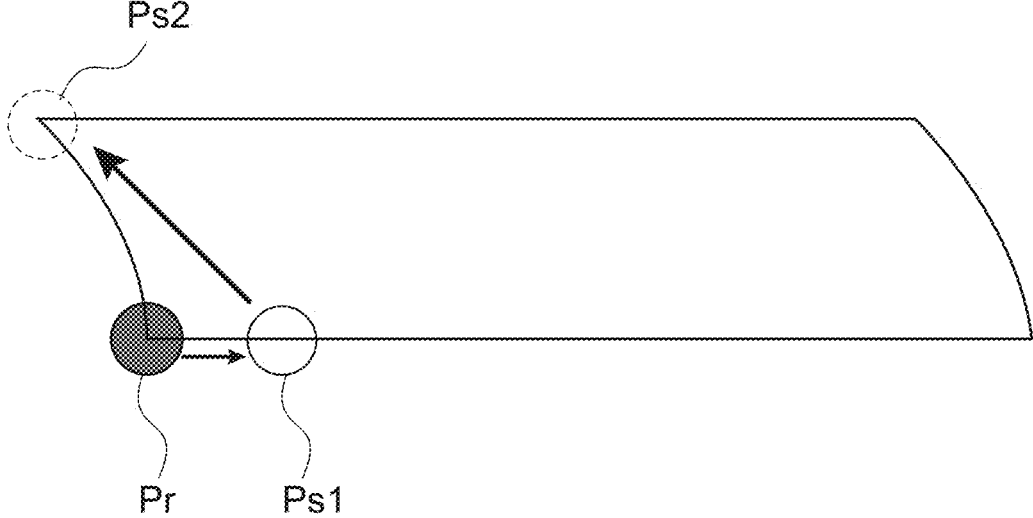
FIG. 2B is an explanatory view schematically illustrating movement of a seat cushion at a time of cockpit unlocking by a user of small physical stature who boards a vehicle, according to the present exemplary embodiment.
Figure 3A:
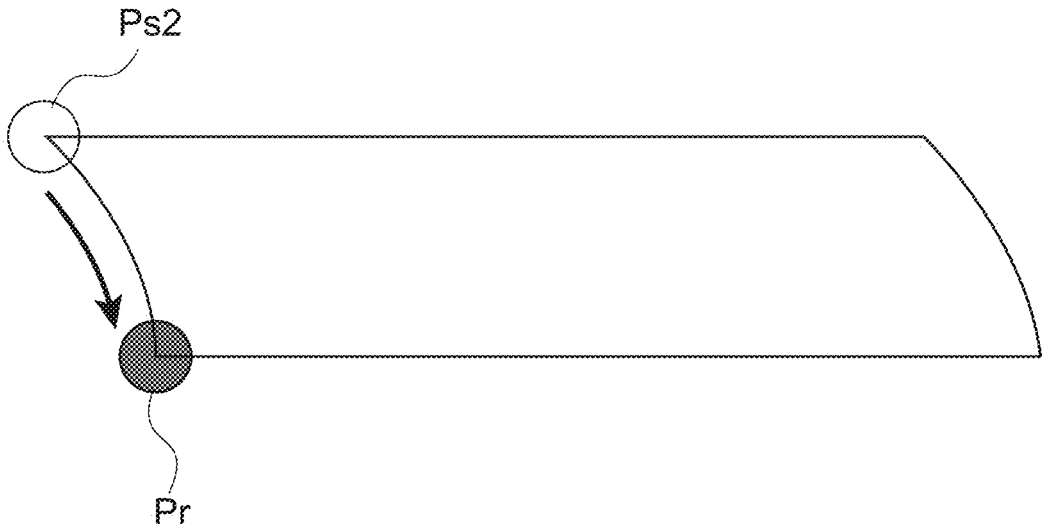
FIG. 3A is an explanatory view schematically illustrating movement of a seat cushion at a time of cockpit locking by a user of small physical stature who disembarks from a vehicle, according to the present exemplary embodiment.
Figure 3B:
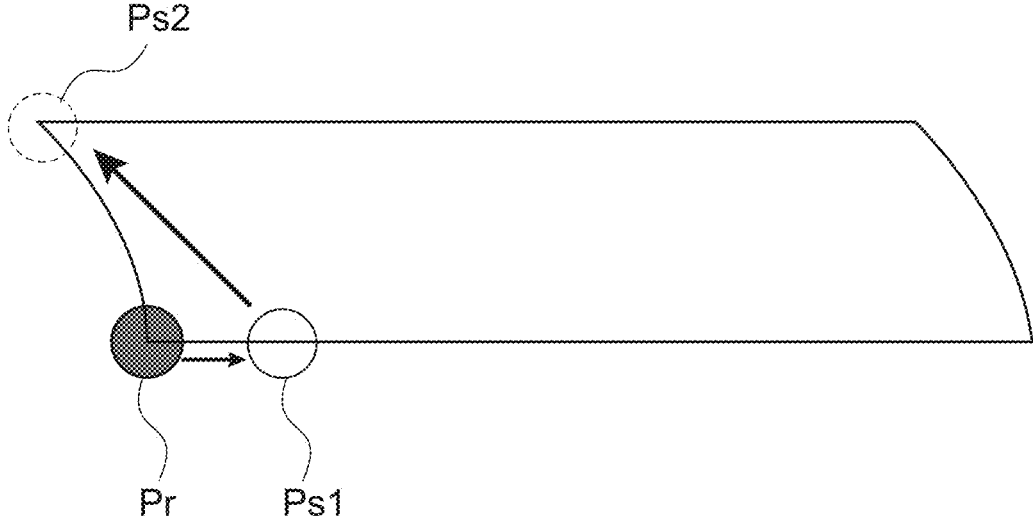
FIG. 3B is an explanatory view schematically illustrating movement of a seat cushion at a time of cockpit unlocking by a user of small physical stature who boards a vehicle, according to the present exemplary embodiment.

More specifically, as illustrated in FIG. 2B and FIG. 3B, in cases of users of small physical stature, such as those corresponding to the human body dummy AF05, for example, the seat cushion 14 moves rearward from the anti-theft seat position Pr to the boarding seat position Ps1 (e.g., about 50 mm toward the rear from the anti-theft seat position Pr) previously registered by the small user of the seat cushion 14, and next, rises and moves toward the front side to the driving seat position Ps2 registered in advance by the small user.

Note that the movement distance of the seat cushion 14 from the anti-theft seat position Pr to the boarding seat position Ps1 (in other words, the movement time of the seat cushion 14 since the movement speed of the seat cushion 14 is constant) is shorter than the movement distance (movement time) of the seat cushion 14 from the anti-theft seat position Pr to the driving seat position Ps. Further, although not illustrated in the drawings, the seatback 16 tilts backward (rotates) to a rearward tilt position previously registered by the small user.

Figure 4A:
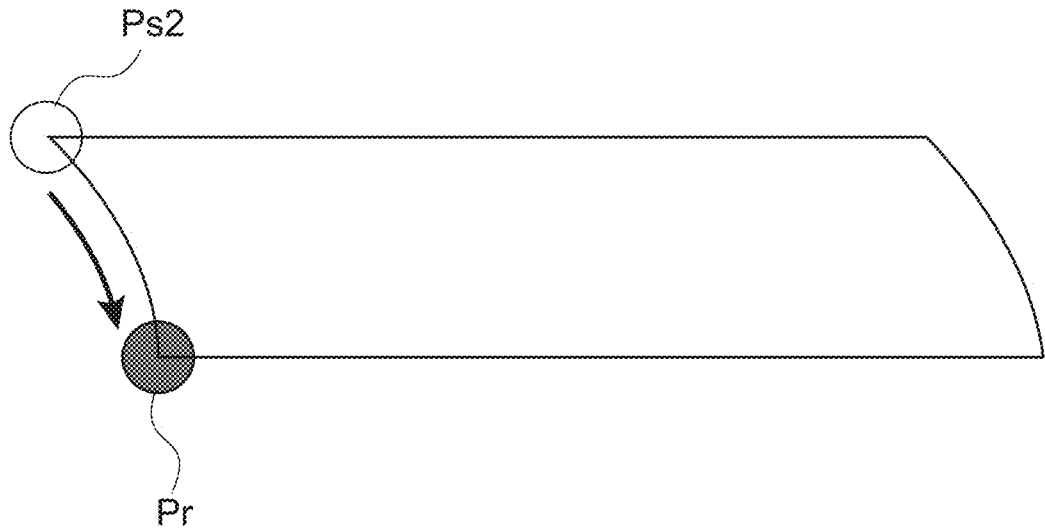
FIG. 4A is an explanatory view schematically illustrating movement of a seat cushion at a time of cockpit locking by a user of small physical stature who disembarks from a vehicle, according to the present exemplary embodiment.
Figure 4B:
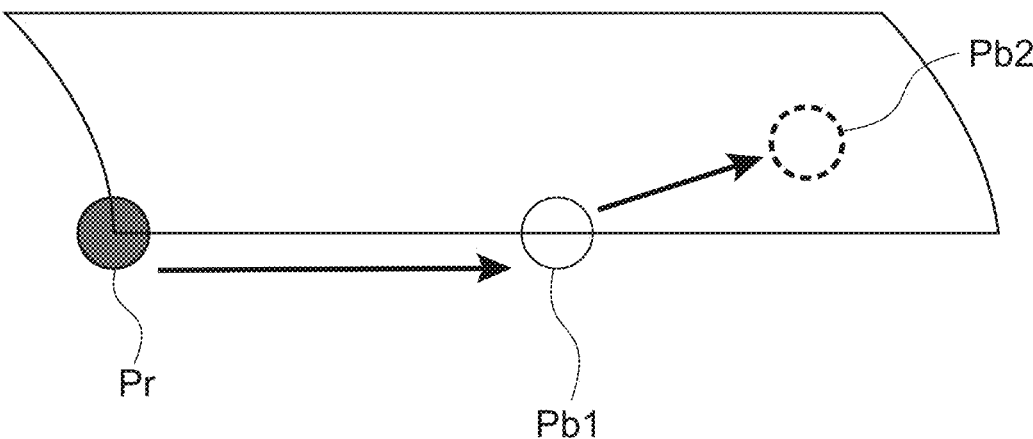
FIG. 4B is an explanatory view schematically illustrating movement of a seat cushion at a time of cockpit unlocking by a user of large physical stature who boards a vehicle, according to the present exemplary embodiment.
Figure 5A:
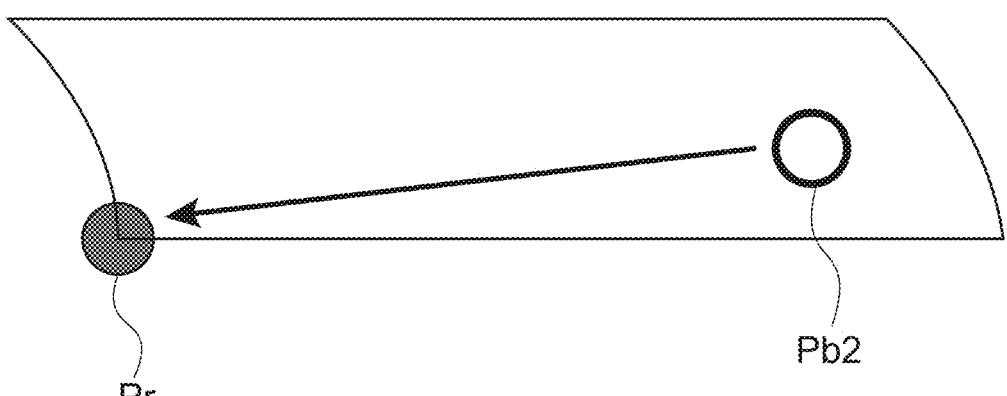
FIG. 5A is an explanatory view schematically illustrating movement of a seat cushion at a time of cockpit locking by a user of large physical stature who disembarks from a vehicle, according to the present exemplary embodiment.
Figure 5B:
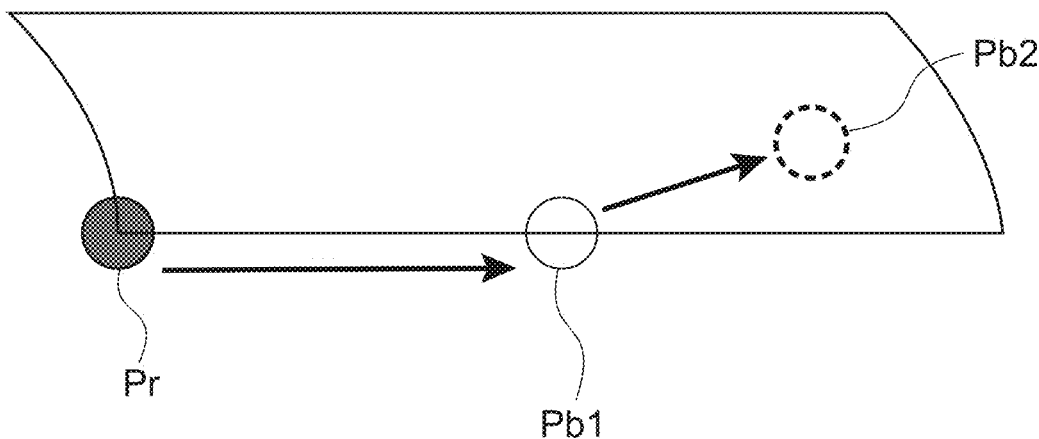
FIG. 5B is an explanatory view schematically illustrating movement of a seat cushion at a time of cockpit unlocking by a user of large physical stature who boards a vehicle, according to the present exemplary embodiment.

On the other hand, in cases of a physically large user, such as the human body dummy AM95, as illustrated in FIGS. 4B and 5B, the seat cushion 14 moves rearward from the anti-theft seat position Pr to the boarding seat position Pb1 (for example, approximately the middle of the slidable range) previously registered by the large user, and next, rises and moves toward the rear side to the driving seat position Pb2 registered in advance by the large user.

Note that the movement distance (movement time) of the seat cushion 14 from the anti-theft seat position Pr to the boarding seat position Pb1 is shorter than the movement distance (movement time) of the seat cushion 14 from the anti-theft seat position Pr to the driving seat position Pb2. Although not illustrated in the drawings, the seatback 16 tilts backward (rotates) to a rearward tilt position previously registered by the large user.

Movement from the boarding seat positions Ps1 and Pb1 to the driving seat positions Ps2 and Pb2 of the respective users is started when a seatbelt (not illustrated) is worn as a trigger. Namely, the configuration is such that when the respective users seated in the seat body 12 of the power seat 10 wear their seatbelt, a sensor (not illustrated in the drawings) detects the wearing, a detection signal is sent to the controller 20, and the slide mechanism 24 and the lifter mechanism 22 are actuated.

Further, the controller 20 is configured so as to automatically set the minimum boarding seat positions Ps1, Pb1 of the seat cushion 14 required for each user to board in accordance with the driving seat positions Ps2, Pb2 of the seat cushion 14 registered by each user. Note that the controller 20 may be configured to automatically set a rearward tilt position of the seatback 16 to a posture suitable for driving by each user in accordance with the driving seat positions Ps2, Pb2 of the seat cushion 14 registered by each user.

Explanation follows regarding the mechanism of the automobile power seat 10 according to the present exemplary embodiment configured as described above.

Figure 6A:
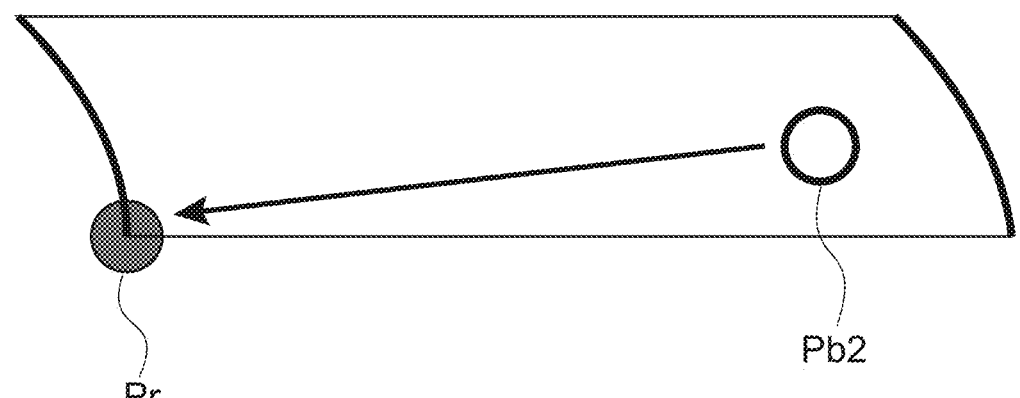
FIG. 6A is an explanatory view schematically illustrating movement of a seat cushion at a time of cockpit locking by a user of large physical stature who disembarks from a vehicle, according to a comparative example.

Explanation follows first regarding a case in which the user who previously disembarked from the vehicle last time was a large user, and the user currently boarding the vehicle is a small user. First, explanation follows regarding comparative examples in which a boarding seat position cannot be registered, based on FIGS. 6A and 6B. As illustrated in FIG. 6A, during cockpit locking by a large user, the seat cushion 14 moves from the driving seat position Pb2 to the anti-theft seat position Pr under the control of the controller 20 that has received the locking signal.

Namely, as illustrated in FIG. 1, the seat cushion 14 slides to the furthest forward position, and descends to the furthest downward position. The seatback 16 tilts forward to the furthest forward tilt position, and the seat cushion 14 and the seatback 16 are locked in the anti-theft seat position Pr and in this posture, respectively, by the seat locking mechanism 28. Thus, as described above, theft of the automobile is prevented.

Figure 6B:
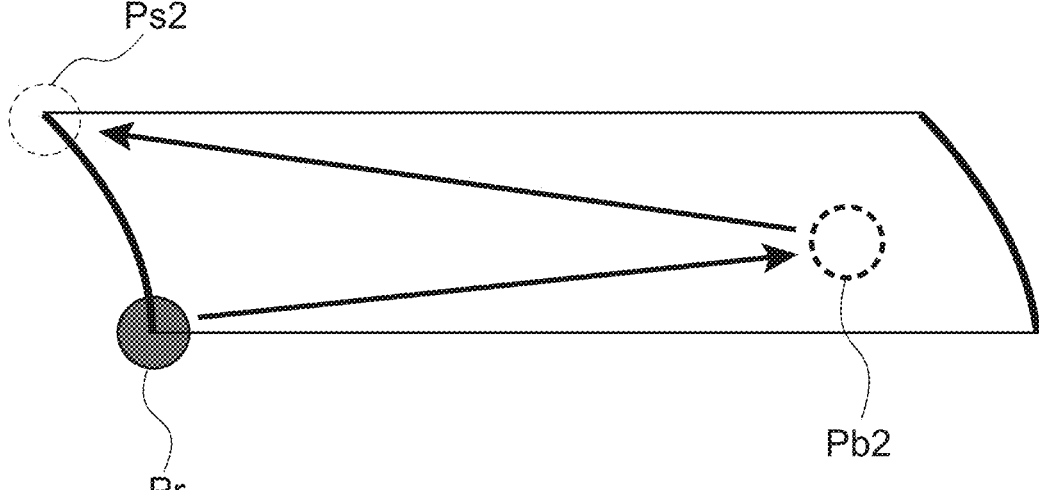
FIG. 6B is an explanatory view schematically illustrating movement of a seat cushion at a time of cockpit unlocking by a user of small physical stature who boards a vehicle, according to a comparative example.

When the cockpit is unlocked by a small user, on the other hand, as illustrated in FIG. 6B, the seat cushion 14 first moves to the driving seat position Pb2 of the previous large user. Namely, in this comparative example, since the boarding seat position cannot be registered, the seat cushion 14 rises as it slides to the previous driving seat position Pb2. Further, although not illustrated in the drawings, the seatback 16 tilts backward (rotates) to a rearward tilt position previously registered by a large user.

Thereafter, the seat cushion 14 slides to the driving seat position Ps2 and rises owing to an operation by the small user. Although not illustrated in the drawings, the seatback 16 is rotated (tilted forward) to a rearward tilt position suitable for the user by operation by the small user. Accordingly, the movement time (waiting time) of the seat body 12 to a boarding seat position (in this case, the driving seat position Pb2) at which a small user can be seated in the seat body 12, and the movement time (adjustment time) of the seat body 12 to the driving seat position Ps2 at which the small user becomes able to drive, are lengthened.

In contrast, in the present exemplary embodiment, as illustrated in FIG. 2A, even if the seat cushion 14 moves from the driving seat position Pb2 to the anti-theft seat position Pr during cockpit locking by a large user, the seat cushion 14 simply moves to the boarding seat position Ps1 registered in advance by a small user when the cockpit is unlocked by the small user, as illustrated in FIG. 2B.

Namely, when the cockpit is unlocked by a small user, it becomes possible to board the automobile by waiting for the seat cushion 14 to move to the boarding seat position Ps1 illustrated in FIG. 2B. The movement distance (movement time) of the seat cushion 14 from the anti-theft seat position Pr to the boarding seat position Ps1 is shorter than the movement distance (movement time) of the seat cushion 14 from the anti-theft seat position Pr to the driving seat position Ps2.

Thus, the movement time (waiting time) when the seat cushion 14 moves from the anti-theft seat position Pr to the boarding seat position Ps1, while of course being less than in the comparative examples, is also less than the movement time (waiting time) when the seat cushion 14 moves directly from the anti-theft seat position Pr to the driving seat position Ps2. Since it is sufficient that the seat cushion 14 moves from the boarding seat position Ps1 to the driving seat position Ps2, compared to those of at least the comparative example, the movement time (adjustment time) from boarding to the driving seat position Ps2 at which driving becomes possible is also shortened.

Thus, in the automobile power seat 10 according to the present exemplary embodiment, when a user with a smaller body size (with a different body size) than during cockpit locking unlocks the cockpit and boards the vehicle, the movement time (waiting time) of the seat cushion 14 from the anti-theft seat position Pr to the boarding seat position Ps1, and further, the movement time (adjustment time) of the seat cushion 14 from the boarding seat position Ps1 to the driving seat position Ps2, can be shortened.

In particular, since as described above, a user can board the vehicle after waiting for the seat cushion 14 to move from the anti-theft seat position Pr to the boarding seat position Ps1 (since the waiting time before boarding can be reduced), there is no inconvenience when one wishes to board an automobile in a hurry, such as in rainy weather. Further, since driving becomes possible after waiting for the seat cushion 14 to move from the boarding seat position Ps1 to the driving seat position Ps2, there is no inconvenience when one wishes to start the automobile in a hurry.

Note that although not illustrated in the drawings, when the cockpit is unlocked by a small user, the seatback 16 is tilted backward (rotated) only to a rearward tilt position registered in advance by the small user. Namely, with respect to the seatback 16, it is sufficient to wait until the seat cushion 14 moves to the boarding seat position Ps1. Thus, compared to a case in which, after the seatback 16 has tilted backward in accordance with a large user, the seatback 16 is further rotated (tilted forward) in accordance with a small user as in the comparative example, it is possible to efficiently reduce the time from boarding to driving becoming possible.

Even in cases in which the user who previously disembarked from the vehicle is a small user, and the user currently boarding the vehicle is a small user, at least the above-described waiting time is reduced. Specifically, as illustrated in FIG. 3A, at a time of cockpit locking by a small user, the seat cushion 14 moves from the driving seat position Ps2 to the anti-theft seat position Pr. When the cockpit is unlocked by a small user, as illustrated in FIG. 3B, the seat cushion 14 moves only to the boarding seat position Ps1 previously registered by the small user.

Here, the movement distance (movement time) of the seat cushion 14 from the anti-theft seat position Pr to the boarding seat position Ps1 is shorter than the movement distance (movement time) of the seat cushion 14 from the anti-theft seat position Pr to the driving seat position Ps2. Thus, when the cockpit is unlocked by a small user, since, as described above, it becomes possible to board the automobile after waiting for the seat cushion 14 to move to the boarding seat position Ps1, compared to cases of waiting until the seat cushion 14 moves from the anti-theft seat position Pr directly to the driving seat position Ps2, the waiting time is reduced.

Explanation follows next regarding a case in which the user who previously disembarked from the vehicle last time was a small user, and the user currently boarding the vehicle is a large user. As illustrated in FIG. 4A, at a time of cockpit locking by a small user, the seat cushion 14 moves from the driving seat position Ps2 to the anti-theft seat position Pr. When the cockpit is unlocked by a large user, as illustrated in FIG. 4B, the seat cushion 14 moves to the boarding seat position Pb1 previously registered by the large user.

Namely, at a time of cockpit unlocking by a large user, it becomes possible to board the automobile after waiting for the seat cushion 14 to move to the boarding seat position Pb1 illustrated in FIG. 4B. Further, the movement distance (movement time) of the seat cushion 14 from the anti-theft seat position Pr to the boarding seat position Pb1 is shorter than the movement distance (movement time) of the seat cushion 14 from the anti-theft seat position Pr to the driving seat position Pb2.

Thus, the movement time (waiting time) for the seat cushion 14 to move from the anti-theft seat position Pr to the boarding seat position Pb1 is shorter than in the comparative example. Since it is sufficient that the seat cushion 14 moves from the boarding seat position Pb1 to the driving seat position Pb2, only a short movement time (adjustment time) is required from boarding until the driving seat position Pb2 at which driving becomes possible.

Thus, in the automobile power seat 10 according to the present exemplary embodiment, when a user with a larger body size (with a different body size) than at the time of cockpit locking unlocks the cockpit and boards the vehicle, it is possible to reduce at least the movement time (waiting time) of the seat cushion 14 from the anti-theft seat position Pr to the boarding seat position Pb1. Thus, there is no inconvenience when one wishes to get into an automobile quickly, such as in rainy weather.

Note that although not illustrated in the drawings, when the cockpit is unlocked by a large user, the seatback 16 tilts backward (rotates) to a rearward tilt position registered in advance by the large user. Namely, in such cases, too, regarding the seatback 16, it is sufficient to wait until the seat cushion 14 moves to the boarding seat position Pb1. Accordingly, compared to a case in which, for example, after the seatback 16 has tilted backward in accordance with a small user, the seatback 16 is further rotated (tilted backward) in accordance with a larger user, the time from boarding to driving becoming possible can be efficiently reduced.

Further, even in cases in which the user who previously disembarked from the vehicle is a large user, and the user currently boarding the vehicle is a large user, at least the above-described waiting time is reduced. Specifically, as illustrated in FIG. 5A, at a time of cockpit locking by a large user, the seat cushion 14 moves from the driving seat position Pb2 to the anti-theft seat position Pr. Then, when a large user unlocks the cockpit, as illustrated in FIG. 5B, the seat cushion 14 moves to the boarding seat position Pb1 previously registered by the large user.

Note that the movement distance (movement time) of the seat cushion 14 from the anti-theft seat position Pr to the boarding seat position Pb1 is shorter than the movement distance (movement time) of the seat cushion 14 from the anti-theft seat position Pr to the driving seat position Pb2. Accordingly, at a time of cockpit unlocking by a large user, as described above, since it becomes possible to board the automobile after waiting for the seat cushion 14 to move to the boarding seat position Pb1, compared to a case of waiting for the seat cushion 14 to move from the anti-theft seat position Pr directly to the driving seat position Pb2, the waiting time is reduced.

Further, movement from the boarding seat position Ps1 to the driving seat position Ps2 and movement from the boarding seat position Pb1 to the driving seat position Pb2 are each started by the wearing of a seatbelt serving as a trigger. Therefore, compared to cases in which the user separately operates the seat cushion 14 to move from the boarding seat position Ps1 to the driving seat position Ps2, or to move from the boarding seat position Pb1 to the driving seat position Pb2, the need for complicated operations is eliminated, and the time from boarding to driving becoming possible can be efficiently reduced.

Since the boarding seat position Ps1 and the boarding seat position Pb1 are automatically set in accordance with the respectively registered driving seat position Ps2 and the driving seat position Pb2, an appropriate boarding seat position Ps1 or boarding seat position Pb1 corresponding to the body size of the user is easily and accurately set. Accordingly, the waiting time to the boarding seat position Ps1 or the boarding seat position Pb1 can be efficiently reduced.

Above, explanation has been given regarding the automobile power seat 10 according to the present exemplary embodiment, based on the drawings; however, the automobile power seat 10 according to the present exemplary embodiment is not limited to those illustrated in the drawings, and design modifications can be made as appropriate without departing from the gist of the present disclosure. For example, the position of the seat cushion 14 during cockpit locking is not limited to the furthest forward position or the furthest downward position, and the posture of the seatback 16 is not limited to the furthest forward tilt position.

Further, registration of the set position and posture of the seat body 12 for each user may be performed using buttons provided at an armrest of a side door or the like. Further, instead of a smart key, the configuration may be such that cockpit locking and cockpit unlocking can be performed by operation of a mobile terminal such as a smart phone.

What is claimed is:

1. An automobile power seat, comprising:
   a seat cushion configured to move to an anti-theft seat position, at which it is impossible to board the automobile, at a time of cockpit locking by a user who has disembarked, and, at a time of cockpit unlocking by a user who is boarding, to move to a boarding seat position at which the user who is boarding is able to board the automobile, and then to a driving seat position at which the user who is boarding is able to drive the automobile;

a seatback configured to rotate to a furthest forward tilt position at the time of cockpit locking, and to rotate to a predetermined rearward tilt position at the time of cockpit unlocking; and a controller having a storage unit at which the boarding seat position and the driving seat position can be registered differently for each user, the controller being configured to control movement of the seat cushion and rotation of the seatback, wherein a movement distance of the seat cushion from the anti-theft seat position to the boarding seat position is shorter than a movement distance of the seat cushion from the anti-theft seat position to the driving seat position.

2. The automobile power seat of claim 1, wherein the controller, upon detecting that a seat belt is worn, moves the seat cushion from the boarding seat position to the driving seat position.

3. The automobile power seat of claim 1, wherein the controller automatically sets the boarding seat position in accordance with the registered driving seat position.

4. The automobile power seat of claim 1, wherein:

the seatback is configured to rotate to a rearward tilt position at which driving of the automobile becomes possible for the user who is boarding at the time of cockpit unlocking, and the rearward tilt position can be registered differently for each user.

* * * * *